(12) United States Patent
Li et al.

(10) Patent No.: US 7,274,131 B2
(45) Date of Patent: Sep. 25, 2007

(54) PIEZOELECTRIC MOTOR WITH ACTUATOR TO MOVE THE ROTOR ABOUT TWO ORTHOGONAL AXES

(75) Inventors: Guo Wei Li, N.T. (HK); Feng Dong Chen, N.T. (HK); Kai Cheng, N.T. (HK)

(73) Assignee: Johnson Electric S.A., La Chaux-de-Fonds (CH)

( * ) Notice: Subject to any disclaimer, the term of this patent is extended or adjusted under 35 U.S.C. 154(b) by 215 days.

(21) Appl. No.: 10/961,040

(22) Filed: Oct. 12, 2004

(65) Prior Publication Data

US 2005/0082947 A1   Apr. 21, 2005

(30) Foreign Application Priority Data

Oct. 11, 2003   (GB) ................... 0323920.9

(51) Int. Cl.
*H01L 41/04* (2006.01)
(52) U.S. Cl. ............... 310/328; 310/311; 310/323.01; 310/323.02; 310/323.03
(58) Field of Classification Search ........... 310/311, 310/328
See application file for complete search history.

(56) References Cited

U.S. PATENT DOCUMENTS

| | | | |
|---|---|---|---|
| 4,727,278 A * | 2/1988 | Staufenberg, Jr. et al. .. | 310/328 |
| 4,862,030 A | 8/1989 | Yokoyama et al. | |
| 5,453,653 A | 9/1995 | Zumeris | |
| 5,872,417 A * | 2/1999 | Sugaya ................... | 310/317 |
| 6,384,514 B1 * | 5/2002 | Slutskiy et al. ......... | 310/323.17 |
| 6,384,515 B1 * | 5/2002 | Ganor et al. ............ | 310/328 |
| 6,397,008 B2 * | 5/2002 | Kuwana et al. .......... | 396/55 |
| 2001/0017665 A1 * | 8/2001 | Ackermann et al. ...... | 348/374 |
| 2002/0036445 A1 * | 3/2002 | Iino et al. ............. | 310/323.16 |

FOREIGN PATENT DOCUMENTS

| | | |
|---|---|---|
| EP | 0 529 637 | 3/1993 |
| EP | 0 633 616 | 1/1995 |
| EP | 0 790 481 | 8/1997 |
| EP | 0 923 144 | 6/1999 |
| EP | 1 234 627 | 8/2002 |
| WO | WO 00/74153 | 12/2000 |

* cited by examiner

*Primary Examiner*—J. San Martin
(74) *Attorney, Agent, or Firm*—Young & Thompson

(57) ABSTRACT

A piezoelectric motor has an actuator which drives a slider. The actuator has a rectangular steel core of square cross-section with an axially projection driving tip. A ceramic piezoelectric element is bonded to each of the four faces of the core. Each piezoelectric element has four quadrants covered by quadrant electrodes on one side and a common or earth electrode on the other side contacting the core which electrically joins the common electrodes. By selective excitation of corresponding diagonally opposite quadrants of opposite piezoelectric elements, the actuator is made to drive the tip in either the X direction or the Y direction. The preferred slider is a spherical ball held captive within arms extending from a housing of the actuator. The driving tip is pressed against the ball by a preload spring acting on the actuator.

21 Claims, 5 Drawing Sheets

PIEZOELECTRIC MOTOR WITH ACTUATOR TO MOVE THE ROTOR ABOUT TWO ORTHOGONAL AXES

CROSS-REFERENCE TO RELATED APPLICATIONS

This non-provisional patent application claims priority under 35 U.S.C. § 119(a) from Patent Application No. 0323920.9 filed in Great Britain on Oct. 11, 2003.

FIELD OF THE INVENTION

This invention relates to an electric motor and in particular, to an electric motor using piezoelectric ceramics.

BACKGROUND OF THE INVENTION

Piezoelectric motors, using piezoelectric ceramics to effect linear or rotary motion are well known. As with a magnet motor, these ceramic motors effect motion in only one dimension, i.e., for a linear motion, back and forth along a line and for rotary motion, clockwise or anti-clockwise about a single axis or line. Hence the one dimension limitation.

However, at times, it is desirable to move an object in more than one dimension, more than just back and forth or rotate clockwise and anti-clockwise. In the past, this required a complex arrangement of motors and gears.

SUMMARY OF THE INVENTION

The aim of the present invention is to provide a piezoelectric motor capable of moving an object in two dimensions, i.e., in an x-y direction or to rotate about two separate axes.

According to a first aspect, the present invention provides a piezoelectric motor comprising: a rotor, an actuator, holding means for holding the actuator in contact with the rotor, wherein the actuator is adapted to move the rotor about two orthogonal axes.

Preferably the actuator has a core of stiff resilient material, the core being elongate with a square cross-section and having four faces and first and second axial ends, the actuator including at least two piezoelectric elements bonded to adjacent faces and a driver extending from the first axial end of the core and engaging the rotor.

Preferably, the actuator has four piezoelectric elements, each bonded to a respective face of the core.

Preferably, each piezoelectric element has two energizable zones ranged axially of the core and the elements are arranged to be energized in diametrically opposite pairs and energizing opposite zones of the diametrically opposite elements, the energized pair of elements determining about which axis movement of the rotor will occur and the energized zones determining in which direction about the chosen axis movement of the rotor will occur.

Alternatively, each element may have four quadrant energizable zones with diametrically quadrants being electrically connected for simultaneous energization. Here, energization of the actuator is caused by energization of an aligned pair of quadrant zones of a pair of diametrically opposite elements, selection of the pair of elements determining the axis of movement of the rotor and the selected quadrant zones determining the direction of movement of the rotor about that axis.

Preferably, the rotor is a spherical ball.

Preferably, the holding means comprises a housing accommodating the actuator and a plurality of arms extending from the housing and adapted to capture the ball while allowing the ball to rotate about the two orthogonal axes.

Preferably, there are four arms extending from the casing, each arm supporting a rotor contact wherein each rotor contact contacts the ball at spaced locations within a hemisphere opposite a hemisphere in which the driver contacts the ball.

Alternatively, there may be two arms rotatably supporting a ring bracket along one of the orthogonal axes and the ring bracket rotatably supports the ball about the other orthogonal axis. Here, the ball may have a fixed shaft which is journalled in bearings of the ring bracket. Also, the ring bracket may be rotatably supported by two stub axles journalled in bearings of the ring bracket and fixed to the support arms and the stub axles may be fixed to the arms by resilient self-aligning bearings.

Preferably, the holding means also includes a spring for resiliently urging the actuator and rotor into contact. A mechanism for adjusting the spring tension may also be provided.

BRIEF DESCRIPTION OF THE DRAWINGS

Preferred embodiments will now be described, by way of example only, with reference to the accompanying drawings, in which.

DETAILED DESCRIPTION OF THE PREFERRED EMBODIMENTS

Figure 1:
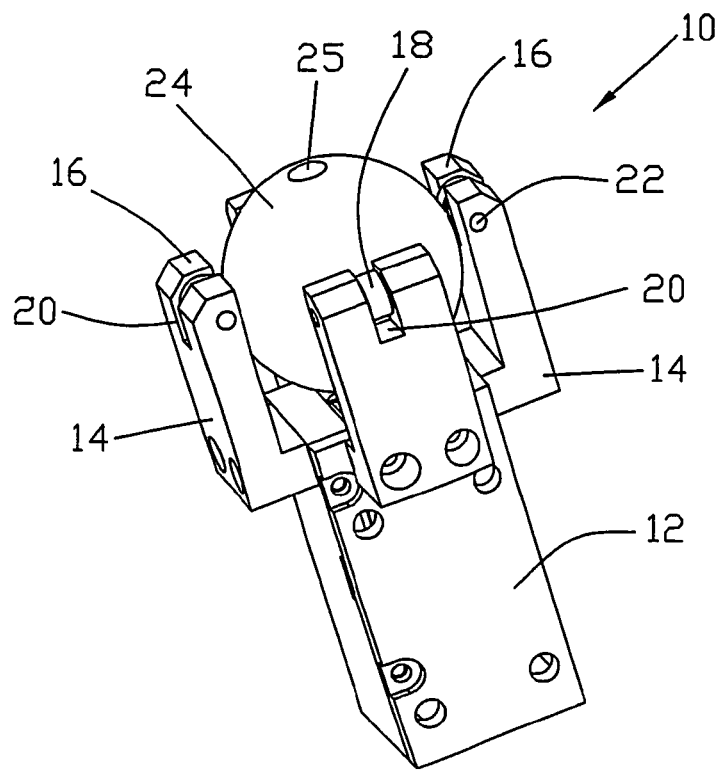
FIG. 1 illustrates a conceptual example of a motor according to the preferred embodiment of the invention.
Figure 2:
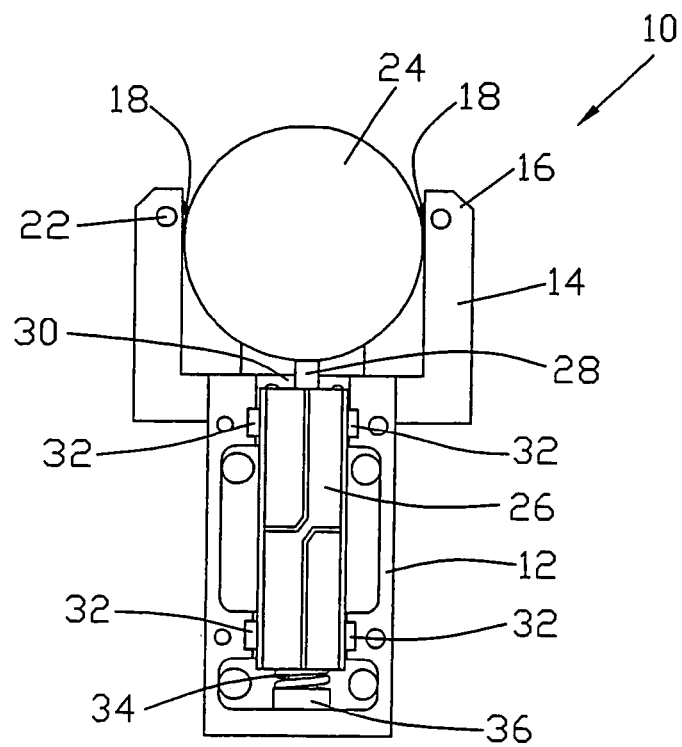
FIG. 2 is a partial sectional view of the motor of FIG. 1.

FIG. 1 illustrates conceptually a motor 10 designed according to a preferred embodiment of the present invention. FIG. 2 is a partial sectional view of the motor 10 of FIG. 1. The motor 10 of FIG. 1 has a housing 12 looking like a rectangular prism.

Extending like raised arms from adjacent the upper end of the housing 12 are four L-shaped supports 14. Each support has a slotted distal end 16. A disc or roller 18 is held in each slot 20 by a pin 22. The pins 22 are offset inwardly to allow the rollers 18 to extend into the space between the supports 14 without extending outwardly of supports.

Within the area defined by the supports is located a spherical ball 24. The ball 24, supports 14 and rollers 18 are sized so that the ball is held captive within the supports by the rollers 18 which contact the ball 24 above its median line, i.e. the rollers contact the ball at spaced locations within an upper hemisphere as viewed in FIG. 1. The ball 24 is the rotor or slider of the motor.

Within the housing 12 is an actuator 26 as shown in FIG. 2. The actuator 26 has a driver or tip 28 which extends through an opening 30 in the top of the housing 12 and contacts the ball 24. The actuator 26, apart from the tip 28, resembles a rectangular prism of square cross-section. Its construction will be described later. The actuator is held within the housing 12 by rubber blocks 32, in this arrangement, eight rubber blocks in total, two on each side. The rubber blocks 32 contact the actuator 26 at nodes or regions of minimal lateral movement of the actuator 26 when the actuator is being excited. The rubber blocks 32 do allow vertical movement or vibration of the actuator. The top end of the actuator is unsupported. A spring 34 or similar device is located between the housing 12 and the bottom end of the actuator 26 to urge the actuator upwardly to press the tip 28 into contact with the ball 24 and thus the ball into contact with the rollers 18. A preload adjuster 36 which may be a simple bolt screwed into the end of the housing 12 provides adjustment to increase or decrease the initial preload on the actuator 26, to vary the frictional force for driving the ball 24.

The ball 24, in this instance, is equivalent to a rotor in a magnet motor with the tip 28 being driven by the actuator 26 to turn the ball. The device to be moved would be fixed to the ball or rotor by any convenient method. A hole 25 is shown in the top of the ball for a press fit connection. One suitable application is for tilting a plate like object such as a mirror in a rear view mirror assembly for a vehicle, wherein the mirror or a mirror holder would be fixed to the ball 24. A flat rotor or slider could be used by replacing the ball and supports with a flat sheet and suitable supports to hold the sheet and actuator in contact.

Figure 3:
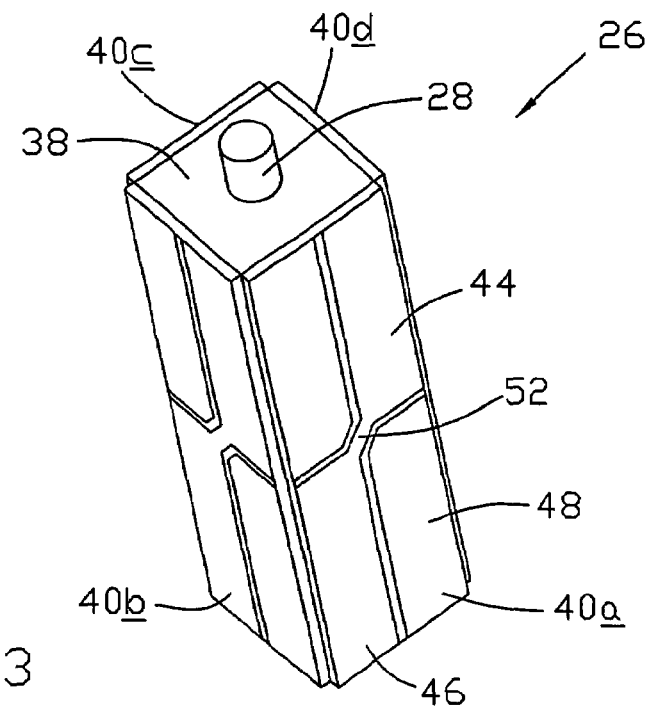
FIG. 3 is a perspective view of an actuator, being a part of the motor of FIG. 1.

The actuator 26 is shown in FIG. 3. It comprises a core 38 in the form of a rectangular block of steel with a square cross-section with a single tip driver 28 extending centrally from the upper end. The tip 28 may be formed by machining the block 38. The four sides of the block 38 are covered by four piezoelectric ceramic elements 40. The piezoelectric elements 40 are glued or otherwise bonded to the side surfaces of the steel block 38.

Figures 4, 5:
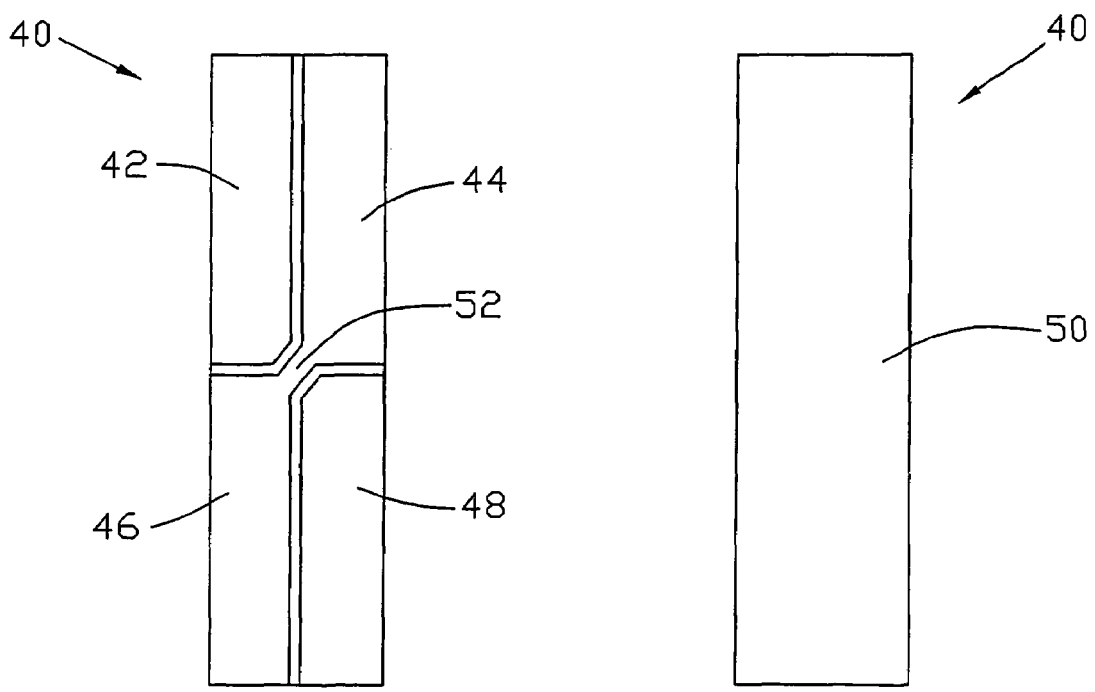
FIG. 4 is a front view of a piezoelectric ceramic element forming a part of the actuator of FIG. 3.
FIG. 5 is a rear view of the piezoelectric ceramic element of FIG. 4.

As illustrated in FIG. 4, the front face of each element 40 is divided into four quadrants 42, 44, 46, 48 and each quadrant is covered by a quadrant electrode.

Here, one pair of diagonally opposite quadrant electrodes are physically and electrically joined by a short narrow connecting strip 52 with the other electrode pair being joined together by a jumper lead (not shown).

The rear face of each sheet is covered by a single ground electrode 50 as shown in FIG. 5. The four ground electrodes are electrically connected together by the steel block 38.

Operation of the actuator will now be described with reference to FIGS. 6 and 7. When piezoelectric ceramic material is positively excited, it stretches. When it is negatively excited, it contracts. By exciting quadrants of an element, the quadrant is made to stretch. By selectively exciting diagonally opposite quadrants, the element bends because of the unexcited adjacent quadrant. By bending opposite elements in the same direction, the actuator bends and stretches.

Figure 6:
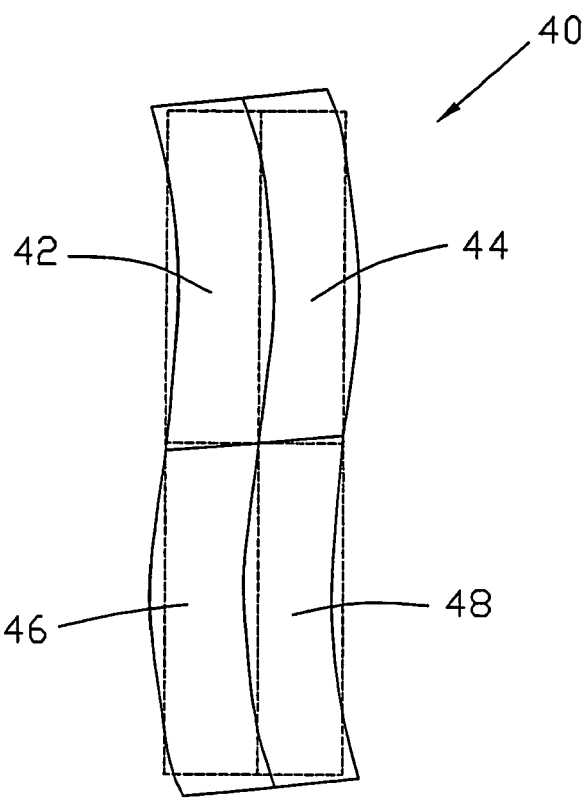
FIG. 6 is a schematic view of a piezoelectric element being excited.

In the preferred embodiment, the diagonally opposite quadrants 42, 46 are excited with a sinusoidal wave form to cause the deformation as shown in FIG. 6 where the voltage is high and positive and returns to normal (or the relaxed state as shown in phantom) when the voltage is low. When the voltage is high and negative, the excited quadrants contract or shrink causing the tip of the actuator to pull away from the slider and the actuator to bend the other way (to the right as viewed).

The actuator functions best when operated in resonance mode. That is when the frequency of the excitation waveform causes the actuator to vibrate or stretch at or near its natural frequency of resonance or a fundamental frequency thereof. This resultant vibration of the actuator will provide nodes or areas of minimal lateral movement on the surface of the actuator where the rubber mounting blocks 32 can resiliently hold and support the actuator without preventing the actuator from vibrating and moving vertically. Maximum performance can be achieved when the input signal frequency matches a fundamental resonance frequency of both longitudinal vibration and bending vibration of the actuator. In the preferred embodiment, the first order longitudinal resonance vibration is matched to the second order bending resonance vibration.

Figure 7:
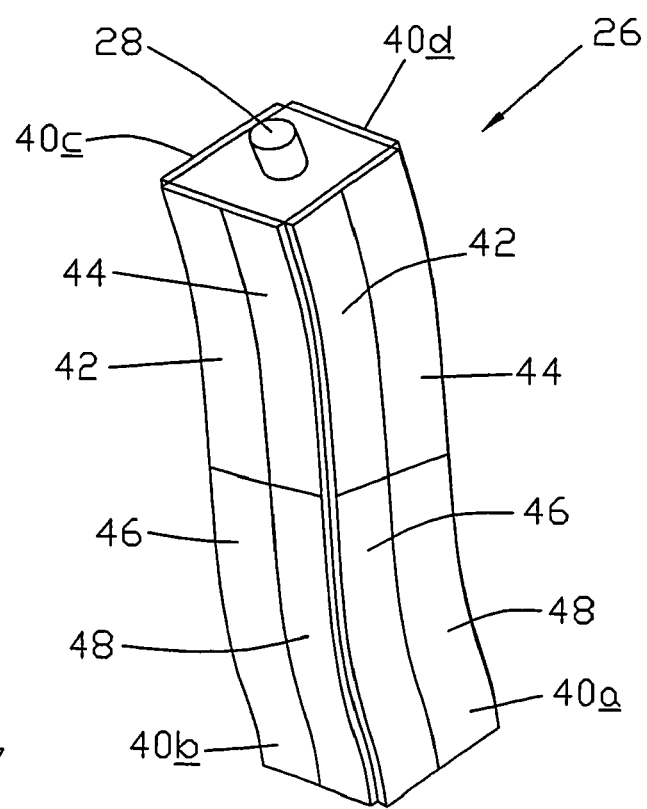
FIG. 7 depicts the actuator of FIG. 3 in an excited state.

In the assembled actuator 26, opposite elements 40 are similarly excited at the same time thereby causing the steel block 38 to bend and stretch as shown exaggerated in FIG. 7. Here quadrants 44 and 46 of sheets 40a and 40c are excited. The stretching causes the tip 28 to move upward and the bending causes it to move to the left as viewed. Movement in the opposite direction, i.e. upward and to the right, would be achieved by exciting the other pair of electrodes 42 and 48 on sheets 40a and 40c.

Movement of the tip 28 upward and into the page or upward and out of the page is achieved by exciting the appropriate pairs of diagonally opposite quadrants of sheets 40b and 40d.

Hence, this single actuator 26 has a driving tip 28 which is able to move in two different dimensions (x and y). When used with a sheet or flat rotor or slider, the resultant movement has x-y freedom within limits. When used with a spherical rotor or slider (as shown for example in FIG. 1), the rotor can be rotated about two separate axes, i.e., X and Y axes.

Figure 8:
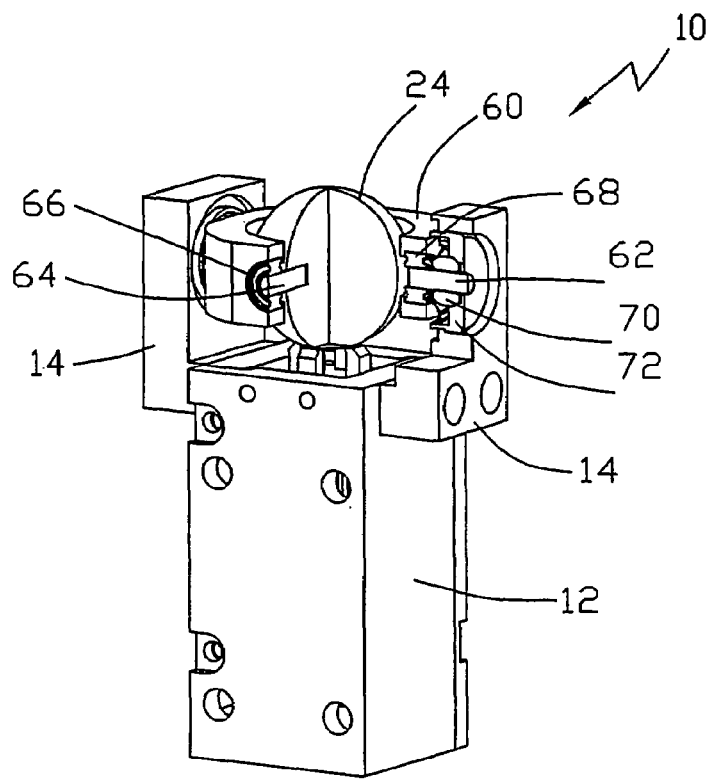
FIG. 8 illustrates, in partial section, a second preferred embodiment of a motor according to the present invention.

Certain applications, such as mirror applications, require only a limited movement of the spherical rotor. For such applications, the rotor can be held by a modified universal joint type coupling, as shown in FIG. 8. In this embodiment, the housing and actuator are as used in the first embodiment and the principle of operation is the same.

The ball 24 is held between two L-shaped supports 14 extending from the housing 12. The supports 14 rotatably support a ring bracket 60 by two coaxial stub axles 62 (only one shown). The ring bracket 60, in turn, rotatably supports the sphere by two coaxial shafts 64 (only one shown). The two shafts 64 are pressed into or otherwise fixed to the ball 24 and extend in opposite directions from the ball and locate in ball bearings 66 of the ring bracket. Thus, the ball 24 is able to freely rotate about the axis of the two shafts 64.

The ring bracket 60 has another two ball bearings 68 (only one shown) fitted to the stub axles 62 allowing the ring bracket 60 and the ball 24 to rotate about the axis of the stub axles. Thus the ball 24 can rotate about two axes, although only through a limited angle about the axis of the stub axles 62 before the ring bracket 60 hits the housing 12. This embodiment has the advantage over the first embodiment of having a significantly lower friction between the ball and the ball supports and also confines movement of the ball to rotation about the two axes.

As the supports 14 are fixed to the housing 12, there may be a slight misalignment between the two stub axles if they were simply pressed into holes in the support arms. To accommodate this slight misalignment, the stub axles of this embodiment are connected to the supports 14 by a self-aligning bushing 70 held by a bearing holder 72 fitted to the support 14. The self-aligning bushing allows the stub axles to be held in alignment while the ball bearing 68 allows low friction rotation. Alternatively, the self-aligning bushing and bearing holder could be replaced, in a lower cost version, by a hard rubber mounting block which would provide limited self-aligning capabilities. Such arrangements are thought to be unnecessary for the shafts 64.

Figures 9, 10, 11:
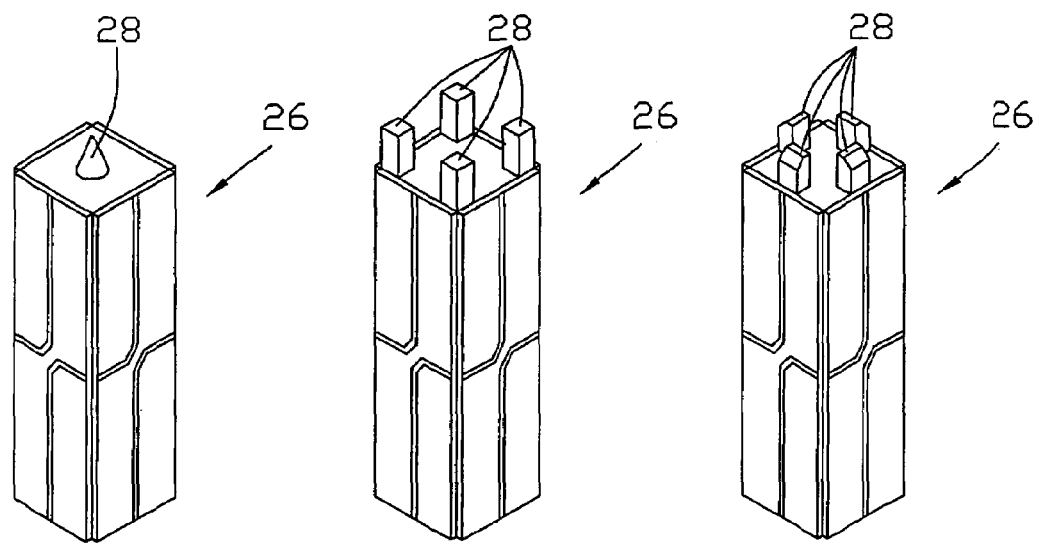
FIGS. 9, 10 and 11 illustrate modified actuators similar to the actuator of FIG. 3.

The embodiments described above are given by way of example only and various modifications will be apparent to persons skilled in the art and without departing from the scope of the invention as defined in the appended claims. For example, the driver tip 28 of the actuator may be conical or pointed as shown in FIG. 9. Alternatively, the driver tip could be comprised of four separate projections, extending from the corners or edges of the core as shown in FIGS. 10 and 11.

Figure 12:
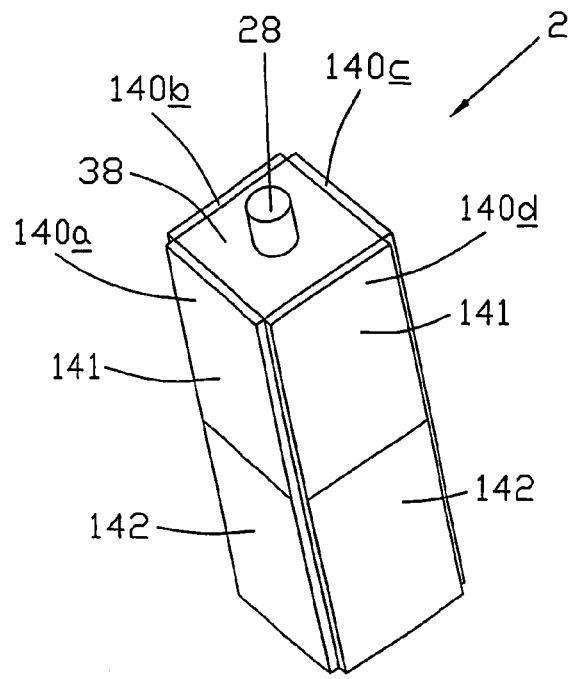
FIG. 12 illustrates an alternative to the actuator of FIG. 3.
Figure 15:
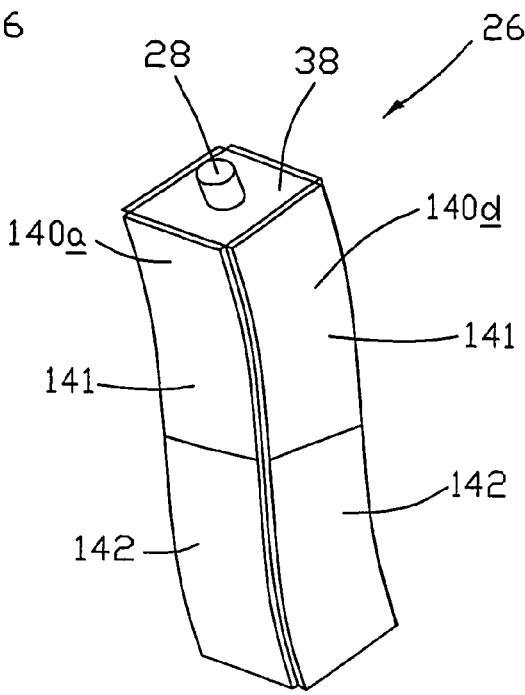
FIG. 15 is a perspective view of the actuator of FIG. 12 in an excited state.
Figure 13:
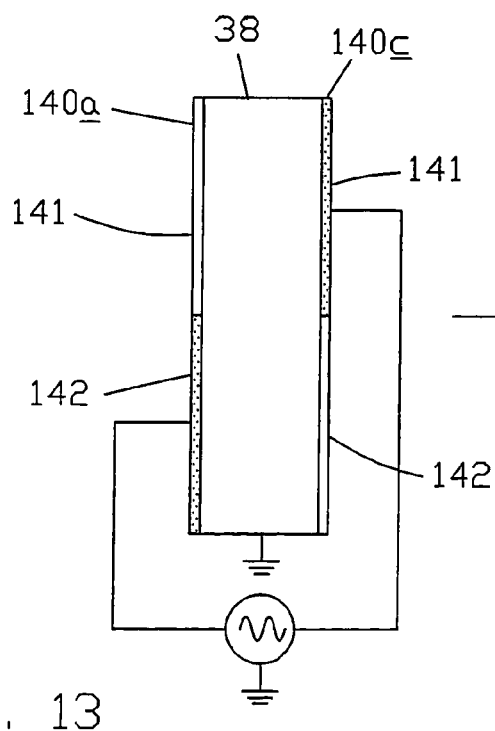
FIGS. 13 and 14 are schematic views of the actuator of FIG. 12 illustrating a mode of operation.
Figure 14:
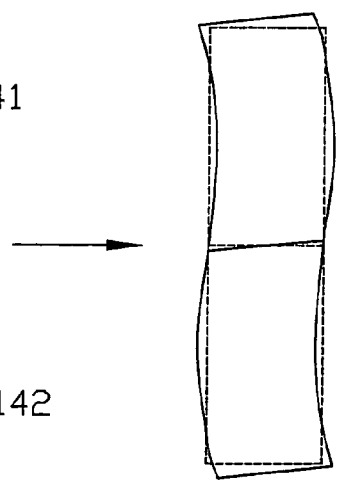

Also, the actuator may be formed, as shown in FIG. 12, using piezoelectric ceramic elements 140 divided into two halves with each half covered by an electrode 141, 142 on one side (face) and a common electrode on the other side (back). Operation of this actuator requires excitation of opposite electrodes of opposed elements causing the actuator to extend and bend in a direction perpendicular to the plane of the excited elements. This is schematically illustrated by FIGS. 13 and 14 where the lower half of element 140*a* and the upper half of element 140*c* are excited by a sinusoidal voltage signal. When the voltage signal is positive, the two halves expand, extending the core and bending the core towards the unexcited portions of the opposed elements. FIG. 15 is a perspective view of the actuator in an excited state similar to the state shown schematically in FIG. 14, where the signal applied to the two half electrodes is high and positive. As described previously, the driving signal is an AC voltage signal, preferably a sinusoidal voltage signal with the core acting as the earth or common connection. The driving tip, as either a single or multiple projections, being caused to vibrate in a circular path to cause the rotor to move. The shape of the circular path may vary depending on the driving frequency and the natural resonance frequency of the actuator in both bending vibration mode and longitudinal vibration mode.

The invention claimed is:

1. A piezoelectric motor comprising:
a rotor, wherein the rotor is a spherical ball,
an actuator,
holding means for holding the actuator in contact with the rotor, wherein the holding means comprises a housing accommodating the actuator and a plurality of arms extending from the housing and adapted to capture the ball while allowing the ball to rotate about two orthogonal axes,
wherein each arm supports a rotor contact wherein each rotor contact contacts the ball at spaced locations within a hemisphere opposite a hemisphere in which the driver contacts the ball,
wherein the actuator has a core of stiff resilient material, the core being elongate with a square cross-section and having four faces and first and second axial ends, the actuator including at least two piezoelectric elements bonded to adjacent faces and a driver extending from the first axial end of the core and engaging the rotor, and
wherein the rotor contacts are rollers journalled on pins and located in slots formed in the distal ends of the arms.

2. The motor of claim 1, wherein the core is steel.

3. The motor of claim 1, wherein the driver is a single projection extending coaxially of the core.

4. The motor of claim 1, wherein the driver comprises four projections extending axially of the core and equally spaced about an axis of the core.

5. The motor of claim 1, wherein the actuator has four piezoelectric elements, each bonded to a respective face of the core.

6. The motor of claim 5, wherein each piezoelectric element has two energizable zones arranged axially of the core and the elements are arranged to be energized in diametrically opposite pairs and energizing opposite zones of the diametrically opposite elements, the energized pair of elements determining about which axis movement of the rotor will occur and the energized zones determining in which direction about the chosen axis movement of the rotor will occur.

7. The motor of claim 5, wherein each piezoelectric element has four quadrant energizable zones with diametrically quadrants being electrically, connected for simultaneous energization.

8. The motor of claim 7, wherein energization of the actuator is caused by energization of an aligned pair of quadrant zones of a pair of diametrically opposite elements, selection of the pair of elements determining the axis of movement of the rotor and the selected quadrant zones determining the direction of movement of the rotor about that axis.

9. The motor of claim 1, wherein the holding means includes a spring for resiliently urging the actuator and rotor into contact.

10. The motor of claim 9, wherein the holding means further comprises a mechanism for adjusting the tension on the spring.

11. The motor of claim 9, wherein the spring acts on a core of the actuator to resiliently urge the actuator into contact with the rotor.

12. The motor of claim 1, wherein the holding means includes a housing and the actuator is held within the housing by resilient support elements.

13. The motor of claim 12, wherein the support elements are rubber blocks contacting the actuator at surface node areas.

14. The motor of claim 1, wherein,
the core is in the form of a single rectangular block with the square cross-section, and
the driver is machined from the block.

15. A piezoelectric motor comprising:
a rotor,
an actuator,
holding means for holding the actuator in contact with the rotor, wherein the actuator is adapted to move the rotor about two orthogonal axes,
wherein the rotor is a spherical ball,
wherein the holding means comprises a housing accommodating the actuator and a plurality of arms extending from the housing and adapted to capture the ball while allowing the ball to rotate about the two orthogonal axes, wherein there are four arms extending from the housing, each arm supporting a rotor contact wherein each rotor contact contacts the ball at spaced locations within a hemisphere opposite a hemisphere in which the driver contacts the ball, and wherein the rotor contacts are rollers journalled on pins and located in slots formed in the distal ends of the arms.

16. A piezoelectric motor comprising:

a rotor, an actuator, holding means for holding the actuator in contact with the rotor, wherein the actuator is adapted to move the rotor about two orthogonal axes, wherein the rotor is a spherical ball, wherein the holding means comprises a housing accommodating the actuator and a plurality of arms extending from the housing and adapted to capture the ball while allowing the ball to rotate about the two orthogonal axes, and wherein there are two arms rotatably supporting a ring bracket along one of the orthogonal axes and the ring bracket rotatably supports the ball about the other orthogonal axis.

17. The motor of claim 16, wherein the ball has a fixed shaft which is journalled in bearings of the ring bracket.

18. The motor of claim 17, wherein the fixed shaft comprises two separate sub-shafts fixed to and extending coaxially in opposite directions from the ball along a common diameter.

19. The motor of claim 16, wherein the ring bracket is rotatably supported by two stub axles journalled in bearings of the ring bracket and fixed to the support arms.

20. The motor of claim 19, wherein the stub axles are fixed to the arms by respective self-aligning mountings.

21. The motor of claim 20, wherein each self-aligning mounting comprises a sintered self-aligning bushing and bushing holder.

* * * * *